United States Patent

Frey et al.

(10) Patent No.: US 7,451,083 B2
(45) Date of Patent: Nov. 11, 2008

(54) REMOVING NOISE FROM FEATURE VECTORS

(75) Inventors: Brendan J. Frey, Mississauga (CA);
Alejandro Acero, Bellevue, WA (US);
Li Deng, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/185,522

(22) Filed: Jul. 20, 2005

(65) Prior Publication Data

US 2005/0256706 A1 Nov. 17, 2005

Related U.S. Application Data

(62) Division of application No. 09/812,524, filed on Mar. 20, 2001, now Pat. No. 6,985,858.

(51) Int. Cl.
*G10L 15/20* (2006.01)
*G10L 15/00* (2006.01)
*G10L 15/04* (2006.01)

(52) U.S. Cl. .................. 704/233; 704/240; 704/251

(58) Field of Classification Search ............ 704/233, 704/239–240, 236, 231, 243–244, 251
See application file for complete search history.

(56) References Cited

U.S. PATENT DOCUMENTS

| 4,897,878 | A | * | 1/1990 | Boll et al. ............... 704/233 |
| 5,148,488 | A | * | 9/1992 | Chen et al. .............. 704/219 |
| 5,148,489 | A | | 9/1992 | Erell et al. .............. 704/226 |
| 5,263,120 | A | | 11/1993 | Bickel .................. 704/200 |
| 5,604,839 | A | | 2/1997 | Acero et al. ............. 704/234 |
| 5,721,808 | A | | 2/1998 | Minami et al. ........... 704/256.2 |
| 5,749,068 | A | * | 5/1998 | Suzuki ................. 704/233 |
| 5,768,474 | A | * | 6/1998 | Neti ................... 704/235 |
| 5,806,029 | A | * | 9/1998 | Buhrke et al. ............ 704/244 |
| 5,924,065 | A | | 7/1999 | Eberman et al. .......... 704/231 |
| 5,956,679 | A | * | 9/1999 | Komori et al. ........... 704/256 |
| 6,026,359 | A | | 2/2000 | Yamaguchi et al. ........ 704/256 |
| 6,067,513 | A | * | 5/2000 | Ishimitsu ............... 704/233 |
| 6,067,517 | A | * | 5/2000 | Bahl et al. ............. 704/256.4 |
| 6,067,520 | A | * | 5/2000 | Lee .................... 704/270 |
| 6,188,976 | B1 | | 2/2001 | Ramaswamy et al. ........ 704/9 |
| 6,188,982 | B1 | * | 2/2001 | Chiang ................. 704/256.5 |
| 6,202,047 | B1 | | 3/2001 | Ephraim et al. .......... 704/256 |
| 6,266,636 | B1 | * | 7/2001 | Kosaka et al. ........... 704/244 |
| 6,289,309 | B1 | | 9/2001 | deVries ................ 704/233 |
| 6,408,269 | B1 | * | 6/2002 | Wu et al. ............... 704/228 |

(Continued)

OTHER PUBLICATIONS

Abrash et al, "Acoustic Adaptation using Non-Linear Transformations of HMM Parameters," in Proceedings ICASSP, pp. 729-732, 1996.*

(Continued)

*Primary Examiner*—James S Wozniak
(74) *Attorney, Agent, or Firm*—Theodore M. Magee; Westman, Champlin & Kelly, P.A.

(57) ABSTRACT

A method and computer-readable medium are provided for identifying clean signal feature vectors from noisy signal feature vectors. One aspect of the invention includes using an iterative approach to identify the clean signal feature vector. Another aspect of the invention includes using the variance of a set of noise feature vectors and/or channel distortion feature vectors when identifying the clean signal feature vectors.

17 Claims, 6 Drawing Sheets

U.S. PATENT DOCUMENTS

| | | | |
|---|---|---|---|
| 6,430,528 B1 | 8/2002 | Joujine et al. | 704/200 |
| 6,446,038 B1 | 9/2002 | Bayya et al. | 704/232 |
| 6,516,297 B1 | 2/2003 | Servetto et al. | 704/222 |
| 6,570,991 B1 | 5/2003 | Scheirer et al. | 704/233 |
| 6,615,170 B1* | 9/2003 | Liu et al. | 704/233 |
| 6,625,587 B1 | 9/2003 | Erten et al. | 704/22 |
| 6,633,842 B1 | 10/2003 | Gong | 704/233 |
| 6,671,666 B1* | 12/2003 | Ponting et al. | 704/233 |
| 6,691,091 B1 | 2/2004 | Cerisara et al. | 704/255 |
| 6,804,647 B1* | 10/2004 | Heck et al. | 704/246 |
| 7,062,433 B2 | 6/2006 | Gong | 704/226 |
| 2002/0002455 A1* | 1/2002 | Accardi et al. | 704/226 |

OTHER PUBLICATIONS

Siohan et al, "Iterative Noise and Channel Estimation Under the Stochastic Matching Algorithm Framework," IEEE Signal Processing Lett., vol. 4, pp. 304-306, Nov. 1997.*

Fujimoto et al. "Noisy Speech Recognition Using Noise Reduction Method Based on Kalman Filter", Proc. ICASSP '00, vol. III, Jun. 2000, pp. 1723-1726.*

Lee et al. "Time-Domain Approach Using Multiple Kalman Filters and EM Algorithm to Speech Enhancement with Nonstationary Noise", IEEE Trans. Speech and Audio Processing, vol. 8, No. 3, May 2000, pp. 282-291.*

Zhao, "Frequency-domain maximum likelihood estimation for automatic speech recognition in additive and convolutive noises," IEEE Trans. Speech Audio Processing, vol. 8, No. 3, May 2000, pp. 255-266.*

U.S. Appl. No. 11/185,159, filed Jul. 20, 2005, Frey et al.

U.S. Appl. No. 09/999,576, filed Nov. 15, 2001, Attias et al.

A.P. Varga and R.K. Moore, "Hidden Markov Model Decomposition of Speech and Noise," in Proceedings of the International Conference on Acoustics, Speech and Signal Processing, IEEE Press., pp. 845-848 (1990).

S. Boll, "Suppression of Acoustic Noise in Speech Using Spectral Subtraction," IEEE Transactions on Acoustics, Speech and Signal Processing, vol. 27, pp. 114-120 (1979).

L. Deng, A. Acero, M. Plumpe & X.D. Huang, "Large-Vocabulary Speech Recognition Under Adverse Acoustic Environments," in Proceedings of the International Conference on Spoken Language Processing, pp. 806-809 (Oct. 2000).

A. Acero, L. Deng, T. Kristjansson and J. Zhang, "HMM Adaptation Using Vector Taylor Series for Noisy Speech Recognition," in Proceedings of the International Conference on Spoken Language Processing, pp. 869-872 (Oct. 2000).

Y. Ephraim, "Statistical-Model-Based Speech Enhancement Systems," Proc. IEEE, 80(10):1526-1555 (1992).

M.S. Brandstein, "On the Use of Explicit Speech Modeling in Microphone Array Application," In Proc. ICASSP, pp. 3613-3616 (1998).

A. Dembo and O. Zeitouni, "Maximum A Posteriori Estimation of Time-Varying ARMA Processes from Noisy Observations," IEEE Trans. Acoustics, Speech and Signal Processing, 36(4): 471-476 (1988).

P. Moreno, "Speech Recognition in Noisy Environments," Carnegie Mellon University, Pittsburgh, PA, pp. 1-130 (1996).

B. Frey, "Variational Inference and Learning in Graphical Models," University of Illinois at urbana, 6 pages (undated).

Y. Ephraim and R. Gray, "A Unified Approach for Encoding Clean and Noisy Sources by Means of Waveform and Autoregressive Model Vector Quantization," IEEE Transactions on Information Theory, vol. 34, No. 4, pp. 826-834 (Jul. 1988).

R. Neal and G. Hinton, "A View of the EM Algorithm that Justifies Incremental, Sparse, and Other Variants," pp. 1-14, in Learning in Graphical Models, Kluewer Academy Publishers, 1998.

J. Lim and A. Oppenheim, "All-Pole Modeling of Degraded Speech," IEEE Transactions on Acoustics, Speech, and Signal Processing, vol. ASSP-26, No. 3, pp. 197-210 (Jun. 1978).

Y. Ephraim, "A Bayesian Estimation Approach for Speech Enhancement Using Hidden Markov Models," IEEE Transactions on Signal Processing, vol. 40, No. 4, pp. 725-735 (Apr. 1992).

"Noise Reduction" downloaded from http://www.ind.rwth-aachen.de/research/noise_reduction.html, pp. 1-11 (Oct. 3, 2001).

A. Acero, "Acoustical and Environmental Robustness in Automatic Speech Recognition," Department of Electrical and Computer Engineering, pp. 1-141 (Sep. 13, 1990).

B. Frey et al., "Algonquin: Iterating Laplace's Method to Remove Multiple Types of Acoustic Distortion for Robust Speech Recognition," In Proceedings of Eurospeech, 4 pages (2001).

All Office Actions (Sep. 29, 2004; May 12, 2005) and Response (Dec. 10, 2004; Jun. 2, 2005) from U.S. Appl. No. 09/812,524, filed Mar. 20, 2001.

Scheirer et al., "Construction and Evaluation of a Robust Multifeature Speech/Music Discriminator," Proc. ICASSP '97, Munich, Germany, Apr. 1997.

Hu et al., "A New Eigenstructure Method for Sinusoidal Signal Retrieval in White Noise: Estimation and Pattern Recognition", IEEE Transactions on Signal Processing, vol. 45, No. 12, Dec. 1997.

Gales, "Predictive Model-Based Compensation Schemes for Robust Speech Recognition," Speech Communication, vol. 25, 1998, pp. 1-31.

Karray, "Solutions for Robust Recognition over the GSM Cellular Network," In Proc. Int. Conf. Acoustics, Speech and Signal Processing (ICASSP '98), USA—Seattle, 1998, pp. 261-264.

Afify et al., "A General Joint Additive and Convolutive Bias Compensation Approach Applied to Noisy Lombard Speech Recognition," IEEE Trans. Speech Audio Processing, vol. 6, Nov. 1998, pp. 524-537.

Office Action dated Jun. 23, 2006 from U.S. Appl. No. 11/185,159, filed Jul. 20, 2005.

* cited by examiner

US 7,451,083 B2

REMOVING NOISE FROM FEATURE VECTORS

REFERENCE TO RELATED APPLICATION

This application is a divisional of and claims priority from U.S. patent application Ser. No. 09/812,524, filed on Mar. 20, 2001, and entitled "METHOD AND APPARATUS FOR REMOVING NOISE FROM FEATURE VECTORS", now U.S. Pat. No. 6,985,858, which is hereby incorporated by reference.

BACKGROUND

A pattern recognition system, such as a speech recognition system, takes an input signal and attempts to decode the signal to find a pattern represented by the signal. For example, in a speech recognition system, a speech signal is received by the recognition system and is decoded to identify a string of words represented by the speech signal.

To decode the incoming signal, most recognition systems utilize one or more models that describe the likelihood that a portion of the test signal represents a particular pattern. Typically, these models do not operate directly on the incoming signal, but instead operate on a feature vector representation of the incoming signal. In speech recognition, such feature vectors can be produced through techniques such as linear predictive coding (LPC), LPC derived cepstrum, perceptive linear prediction (PLP), and mel-frequency cepstrum coefficients (MFCC) feature extraction.

The incoming signal is often a combination of signals from different sources, each modified by a channel. For example, the incoming signal may be a mixture of an original signal, which contains the pattern to be recognized, and one or more obscuring signals, such as additive noise and channel distortion. In speech recognition, the incoming signal may be a combination of the speech signal to be fed into a speech recognizer, additive noise, and channel distortion such as telephone channel distortion, or reverberations generated by the speech signal bouncing off walls in a room. Or, the incoming signal may be a combination of a speech signal with a channel signal (impulse response of the channel), where the channel signal is to be fed into a system that recognizes channel types. Or, the incoming signal may be a mixture of the speech signals from two different speakers, each modified by a different channel, and each of which is to be fed into a speech recognizer.

Because noise and channel distortion make it more difficult to recognize a pattern in the incoming signal, it is often desirable to remove the noise and the channel distortion before performing pattern recognition. However, removing noise and channel distortion from the incoming signal itself is computationally difficult because of the large amount of data that has to be processed. To overcome this problem, some prior art techniques have tried to remove noise from the feature vector representation of the incoming signal instead of the incoming signal itself because the feature vector representation is more compact than the incoming signal.

However, past techniques for removing noise from feature vectors have relied on point models for the noise and the channel distortion. In other words, the noise reduction techniques have assumed that one single feature vector can represent the noise and another single feature vector can represent the channel distortion. The point models may be adapted to a sequence of input features, but they are held constant across the sequence. Because the noise and channel distortion vary across the sequence of input features, techniques that use this approximation do not accurately remove the noise or channel distortion.

Some prior art techniques for removing noise from feature vectors attempt to identify the most likely combination of a noise feature vector, a channel distortion feature vector, and an original signal feature vector that would have produced the noisy feature vector. To make this determination, the prior art relies on an approximation of the relationship between noise, channel distortion, original signals, and incoming signals.

However, prior art systems do not take the error present in the approximation into account when identifying possible combinations of noise, channel distortion, and original signals based on the incoming signal. In addition, the form of the approximation is typically set once and then used to identify the best combination. If the form of the approximation is not accurate, the resulting identified combination of noise, channel distortion, and original signal will be inaccurate. However, the prior art does not provide a means for adjusting the form of the approximation to improve the resulting identified combination.

SUMMARY

A method and computer-readable medium are provided for identifying clean signal feature vectors from noisy signal feature vectors. One aspect of the invention includes using an iterative approach to identify the clean signal feature vector. Another aspect of the invention includes using the variance of a set of noise feature vectors and/or channel distortion feature vectors when identifying the clean signal feature vectors.

DETAILED DESCRIPTION OF ILLUSTRATIVE EMBODIMENTS

Figure 1:
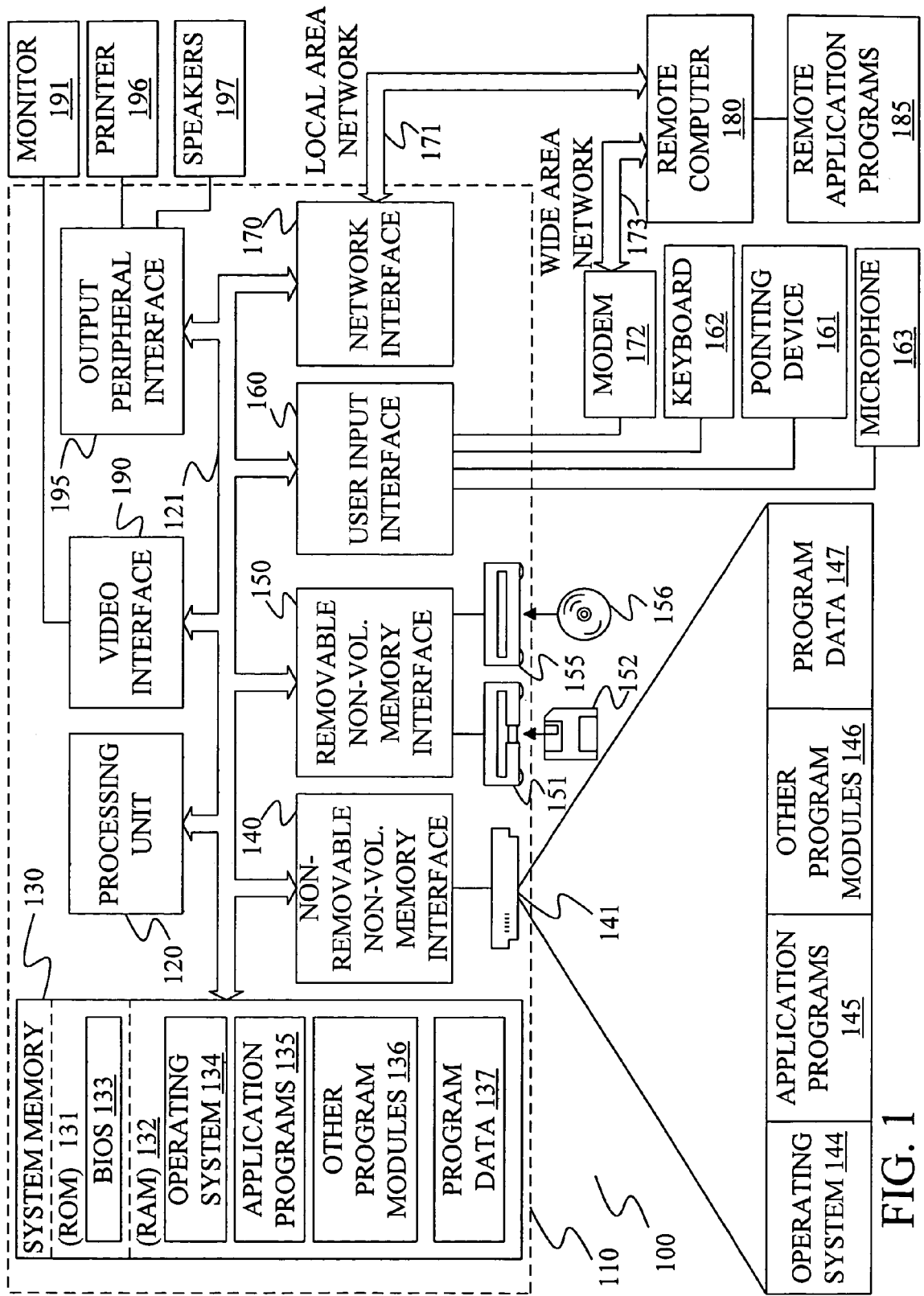
FIG. 1 is a block diagram of a general computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way o example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
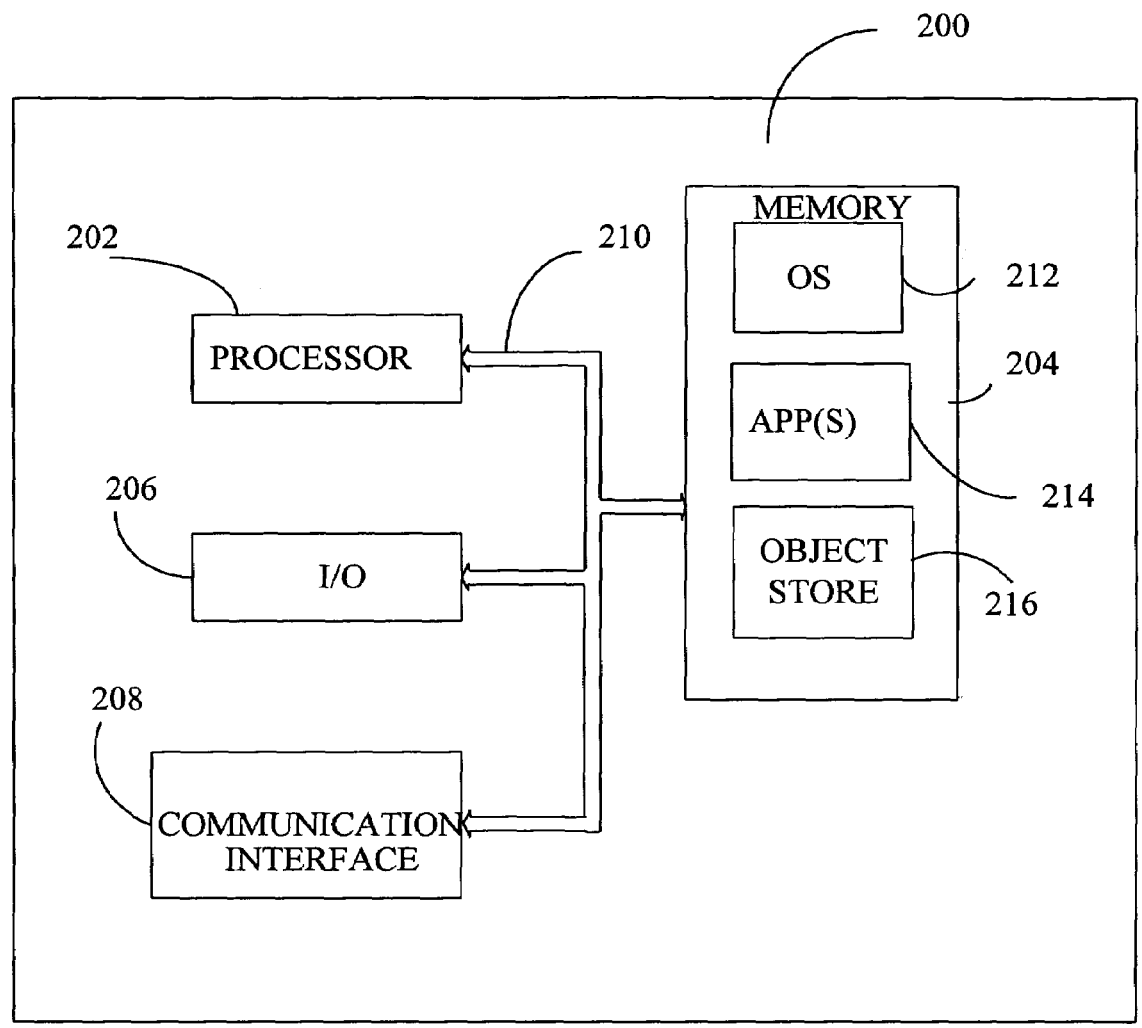
FIG. 2 is a block diagram of a mobile device in which the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Figure 3:
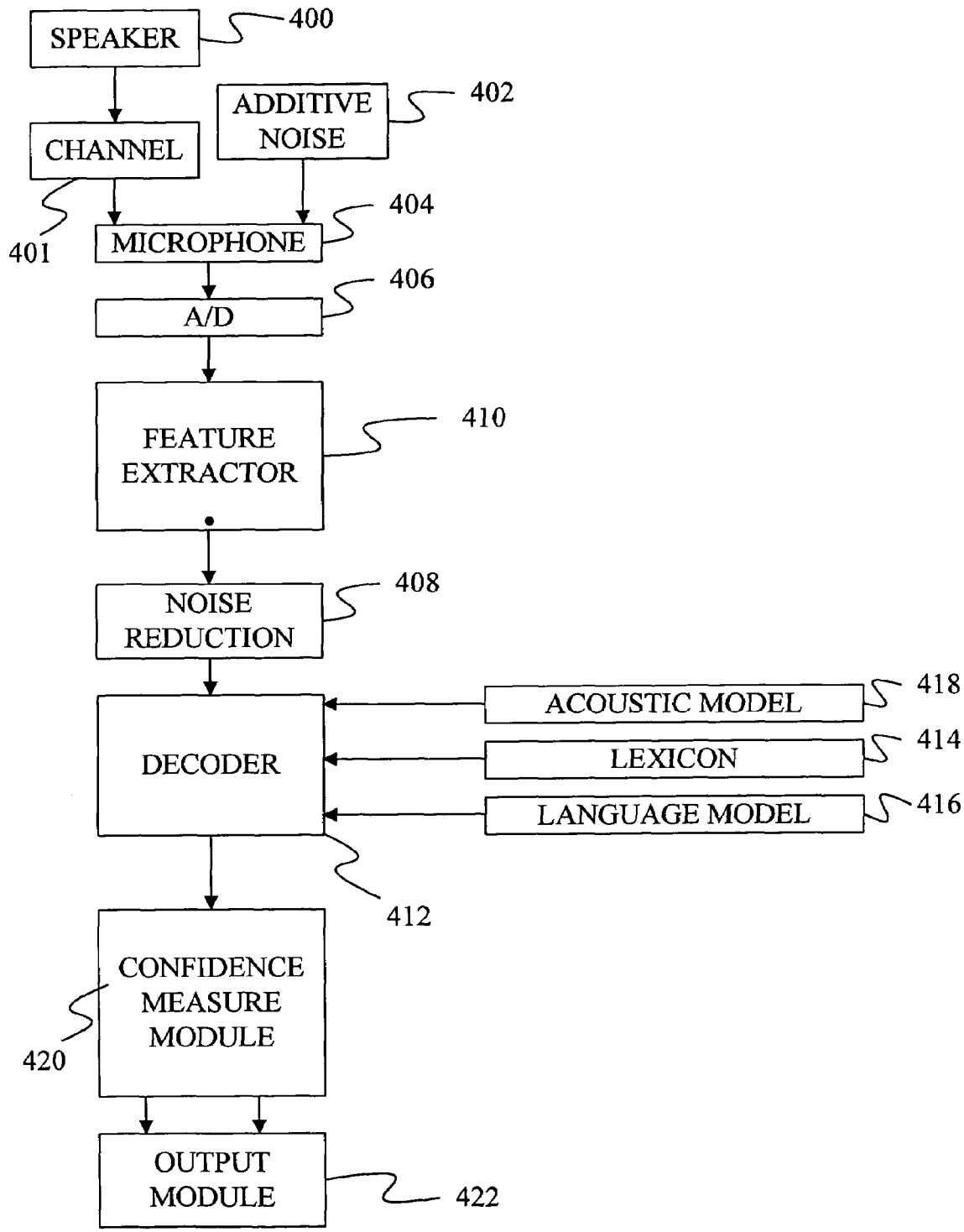
FIG. 3 is a block diagram of a speech recognition system in which one embodiment of the present invention is practiced.

FIG. 3 provides a block diagram of hardware components and program modules found in the general computing environments of FIGS. 1 and 2 that are particularly relevant to an embodiment of the present invention used for speech recognition. In FIG. 3, an input speech signal from a speaker 400 pass through a channel 401 and together with additive noise 402 is converted into an electrical signal by a microphone 404, which is connected to an analog-to-digital (A-to-D) converter 406.

A-to-D converter 406 converts the analog signal from microphone 404 into a series of digital values. In several embodiments, A-to-D converter 406 samples the analog signal at 16 kHz and 16 bits per sample, thereby creating 32 kilobytes of speech data per second.

The output of A-to-D converter 406 is provided to feature extractor 400, which extracts a feature from the digital speech signal. Examples of feature extraction modules include modules for performing Linear Predictive Coding (LPC), LPC derived cepstrum, Perceptive Linear Prediction (PLP), Auditory model feature extraction, and Mel-Frequency Cepstrum Coefficients (MFCC) feature extraction. Note that the invention is not limited to these feature extraction modules and that other modules may be used within the context of the present invention.

The feature extraction module receives the stream of digital values from A-to-D 406 and produces a stream of feature vectors that are each associated with a frame of the speech signal. In many embodiments, the centers of the frames are separated by 10 milliseconds.

The stream of feature vectors provided by A-to-D converter 406 represents a noisy speech signal which is the combination of a clean speech signal, additive noise and channel distortion. These noisy feature vectors are provided to a noise reduction module 408 of the present invention, which generates a stream of "clean" feature vectors from the noisy feature vectors.

The stream of "clean" feature vectors produced by noise reduction module 408 is provided to a decoder 412, which identifies a most likely sequence of words based on the stream of "clean" feature vectors, a lexicon 414, a language model 416, and an acoustic model 418.

In some embodiments, acoustic model 418 is a Hidden Markov Model consisting of a set of hidden states. Each linguistic unit represented by the model consists of a subset of these states. For example, in one embodiment, each phoneme is constructed of three interconnected states. Each state has an associated set of probability distributions that in combination allow efficient computation of the likelihoods against any arbitrary sequence of input feature vectors for each sequence of linguistic units (such as words). The model also includes probabilities for transitioning between two neighboring model states as well as allowed transitions between states for particular linguistic units. By selecting the states that provide the highest combination of matching probabilities and transition probabilities for the input feature vectors, the model is able to assign linguistic units to the speech. For example, if a phoneme was constructed of states 0, 1 and 2 and if the first three frames of speech matched state 0, the next two matched state 1 and the next three matched state 2, the model would assign the phoneme to these eight frames of speech.

Note that the size of the linguistic units can be different for different embodiments of the present invention. For example, the linguistic units may be senones, phonemes, noise phones, diphones, triphones, or other possibilities.

In other embodiments, acoustic model 418 is a segment model that indicates how likely it is that a sequence of feature vectors would be produced by a segment of a particular duration. The segment model differs from the frame-based model because it uses multiple feature vectors at the same time to make a determination about the likelihood of a particular segment. Because of this, it provides a better model of large-scale transitions in the speech signal. In addition, the segment model looks at multiple durations for each segment and determines a separate probability for each duration. As such, it provides a more accurate model for segments that have longer durations. Several types of segment models may be used with the present invention including probabilistic-trajectory segmental Hidden Markov Models.

Language model 416 provides a set of likelihoods that a particular sequence of words will appear in the language of interest. In many embodiments, the language model is based on a text database such as the North American Business News (NAB), which is described in greater detail in a publication entitled CSR-III Text Language Model, University of Penn., 1994. The language model may be a context-free grammar or a statistical N-gram model such as a trigram. In one embodiment, the language model is a compact trigram model that determines the probability of a sequence of words based on the combined probabilities of three-word segments of the sequence.

Based on the acoustic model, the language model, and the lexicon, decoder 412 identifies a most likely sequence of words from all possible word sequences. The particular method used for decoding is not important to the present invention and any of several known methods for decoding may be used.

The most probable sequence of hypothesis words is provided to a confidence measure module 420. Confidence measure module 420 identifies which words are most likely to have been improperly identified by the speech recognizer, based in part on a secondary frame-based acoustic model. Confidence measure module 420 then provides the sequence of hypothesis words to an output module 422 along with identifiers indicating which words may have been improperly identified. Those skilled in the art will recognize that confidence measure module 420 is not necessary for the practice of the present invention.

Although the noise reduction technique of the present invention can be used in noise reduction module 408, the invention is not limited to being used in speech recognition. Those skilled in the art will recognize that the invention may be used in any appropriate pattern recognition system. In addition, the invention may be used during the training of a pattern recognizer as well as during the detection of patterns. Those skilled in the art will also recognize that the method can be extended to multiple sources and multiple channels. Also, the invention may be used for purposes other than automatic recognition, such as denoising features for the purpose of reconstructing an enhanced signal.

The noise reduction technique of the present invention identifies an optimal combination of obscuring signals and clean speech given an observed noisy speech vector. To do this, the present invention relies in part on the well-known Baysian rule:

$$p(n, x, c \mid y) = \frac{p(y \mid n, x, c) p(n, x, c)}{p(y)} \qquad \text{EQ. 1}$$

where $p(n,x,c|y)$ is the posterior probability of a clean feature vector, x, a noise feature vector, n, and a channel distortion feature vector, c, given a noisy feature vector, y, $p(y|n,x,c)$ is the observation probability of a noisy feature vector given a clean feature vector, a noise feature vector, and a channel distortion feature vector, $p(n,x,c)$ is the prior probability of the combination of a clean feature vector, a noise feature vector, and a channel distortion feature vector, and $p(y)$ is the total probability for an observed noisy feature vector. Note that in this example, the noise feature vectors and the channel distortion feature vectors each provide separate forms of obscuring feature vectors.

Once an approximation to the posterior $p(n,x,c|y)$ has been found, the maximum a posteriori features may be chosen. Or, in another embodiment, the average values of the features may be chosen. Those skilled in the art will recognize that other statistics can be extracted from the posterior. In fact, a representation of the posterior probability distribution itself can be fed into a recognition system.

Since $p(y)$ is the same for all combinations of noise feature vectors, clean signal feature vectors, and channel distortion feature vectors, it can be ignored when searching for an approximation to the posterior distribution over noise feature vectors, clean signal feature vectors, and channel distortion feature vectors.

Under one embodiment of the present invention, the posterior probability (as well as the prior probability) is represented by a mixture of Gaussians, where each mixture component of the posterior probability is determined separately using a separate prior probability mixture component and a separate observation probability mixture component. Thus, mixture component i of the posterior probability is formed based on mixture component i of the prior probability and mixture component i of the observation probability.

Figure 4:
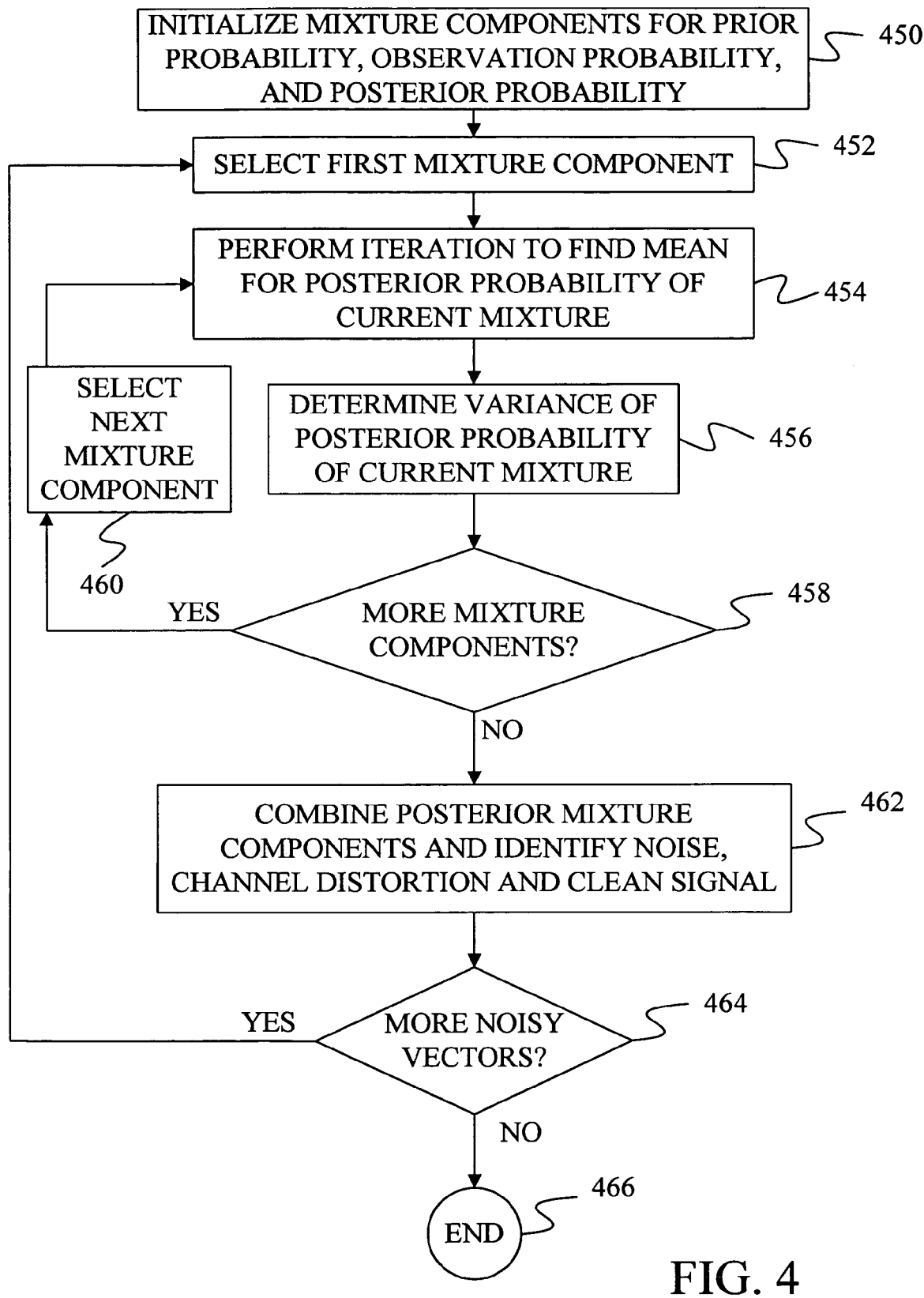
FIG. 4 is a flow diagram of the noise reduction technique of one embodiment of the present invention.

The process for identifying the combination of noise, channel distortion and original signal that provides the most likely posterior probability, $p(n,x,c|y)$ is shown in FIG. 4. The process of FIG. 4 begins at step 450 where the means and variances for the mixture components of the prior probability, observation probability and posterior probability are initialized. The process of step 450 is shown in greater detail in FIG. 5.

Figure 5:
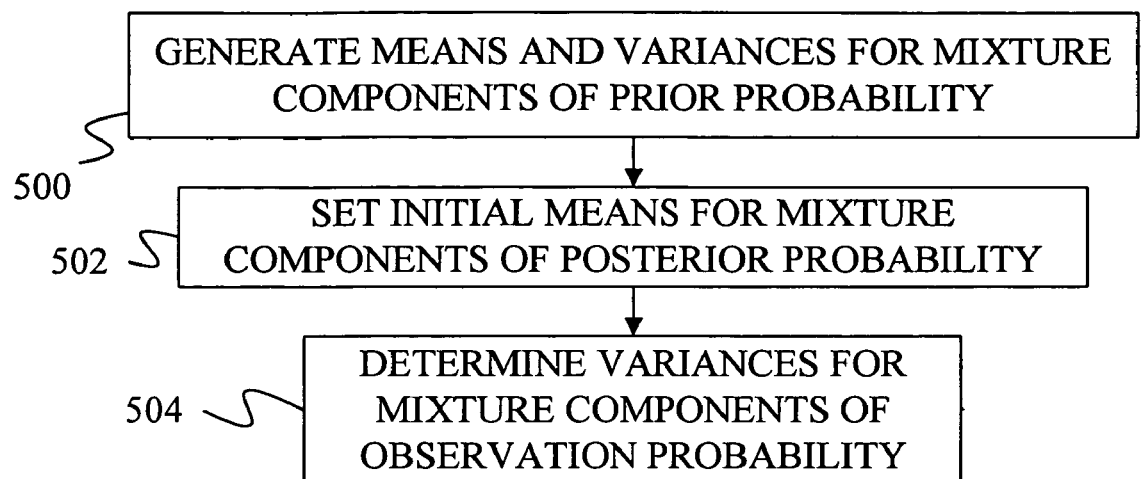
FIG. 5 is a flow diagram of initialization step 450 of FIG. 4.

In step 500 of FIG. 5, the means and variances for each mixture component of the prior probability are generated. To generate the means and variances, the process of the present invention first generates a mixture of Gaussians that describes the distribution of a set of training noise feature vectors, a second mixture of Gaussians that describes a distribution of a set of training channel distortion feature vectors, and a third mixture of Gaussians that describes a distribution of a set of training clean signal feature vectors. The mixture components can be formed by grouping feature vectors using a maximum likelihood training technique or by grouping feature vectors that represent a temporal section of a signal together. Those skilled in the art will recognize that other techniques for grouping the feature vectors into mixture components may be used and that the two techniques listed above are only provided as examples.

After the feature vectors have been grouped into their respective mixture components, the mean and variance of the feature vectors within each component is determined. In an embodiment in which maximum likelihood training is used to group the feature vectors, the means and variances are provided as by-products of grouping the feature vectors into the mixture components.

After the means and variances have been determined for the mixture components of the noise feature vectors, clean signal feature vectors, and channel feature vectors, these mixture components are combined to form a mixture of Gaussians that describes the total prior probability. Using one technique, the mixture of Gaussians for the total prior probability will be formed at the intersection of the mixture components of the noise feature vectors, clean signal feature vectors, and channel distortion feature vectors.

Once the means and variances for the mixture components of the prior probability have been determined, the process of FIG. 5 continues at step 502 where initial means for the mixture components of the posterior probability are set. Under one embodiment of the invention, the initial means are set to be equal to the means of the prior probability's mixture components.

At step 504, the variances for the mixture components of the observation probability are determined. Under one embodiment, these variances are formed using a closed form expression of the form:

$$\mathrm{VAR}(y \mid x, n) = \frac{\alpha^2}{\cosh((n-x)/2)^2} \qquad \text{EQ. 2}$$

where $\alpha$ is estimated from the training data.

Under other embodiments, these variances are formed using a training clean signal, a training noise signal, and a set of training channel distortion vectors that represent the channel distortion that will be applied to the clean signal and noise signal.

The training clean signal and the training noise signal are separately converted into sequences of feature vectors. These feature vectors, together with the channel distortion feature vectors are then applied to an equation that approximates the relationship between observed noisy vectors and clean signal vectors, noise vectors, and channel distortion vectors. Under one embodiment, this equation is of the form:

$$\underline{y} \approx \underline{c} + \underline{x} + C(\ln(1 + e^{(C^{-1}[\underline{n}-\underline{c}-\underline{x}])})) \qquad \text{EQ. 3}$$

where $\underline{y}$ is an observed noisy feature vector, $\underline{c}$ is a channel distortion feature vector, $\underline{x}$ is a clean signal feature vector, $\underline{n}$ is a noise feature vector, C is a transformation matrix, and $C^{-1}$ is the inverse of the transformation matrix. In equation 3:

$$\ln(1+e^{(C^{-1}[\underline{n}-\underline{c}-\underline{x}])}) = \begin{bmatrix} \ln\!\left(1+e^{\left(\sum_j C_{1j}^{-1}[n_j-c_j-x_j]\right)}\right) \\ \ln\!\left(1+e^{\left(\sum_j C_{2j}^{-1}[n_j-c_j-x_j]\right)}\right) \\ \vdots \\ \ln\!\left(1+e^{\left(\sum_j C_{Kj}^{-1}[n_j-c_j-x_j]\right)}\right) \end{bmatrix} \qquad \text{EQ. 4}$$

where $n_j$, $c_j$, and $x_j$ are the jth elements in the noise feature vector, channel feature vector, and clean signal feature vector, respectively, and $C^{-1}_{ij}$ is the i,j th entry of the inverse matrix $C^{-1}$.

In one embodiment of equation 3 above, the transform matrix C is an orthonormal matrix of discreet cosine transformation coefficients when the feature extraction technique produces cepstrum feature vectors. For embodiments that use a log spectrum feature extraction technique, C is the identity matrix. Those skilled in the art will recognize that other transform matrices, C, will be used in equation 3 depending on the particular feature extraction technique used to form the feature vectors.

In fact, $C^{-1}$ need not be square or of full rank, in which case $C^{-1}$ is a pseudoinverse matrix or another suitable matrix.

Under one embodiment, the training clean signal feature vectors, training noise feature vectors, and channel distortion feature vectors used to determine the mixture components of the prior probability, are reused in equation 3 to produce calculated noisy feature vectors. Thus, each mixture component of the prior probability produces its own set of calculated noisy feature vectors.

The training clean signal is also allowed to pass through a training channel before being combined with the training noise signal. The resulting analog signal is then converted into feature vectors to produce a sequence of observed noisy feature vectors. The observed noisy feature vectors are aligned with their respective calculated noisy feature vectors so that the observed values can be compared to the calculated values.

For each mixture component in the prior probability, the average difference between the calculated noisy feature vectors associated with that mixture component and the observed noisy feature vectors is determined. This average value is used as the variance for the corresponding mixture component of the observation probability. Thus, the calculated noisy feature vector produced from the third mixture component of the prior probability would be used to produce a variance for the third mixture component of the observation probability. At the end of step 504, a variance has been calculated for each mixture component of the observation probability.

After the mixture components of the prior probability, observation probability, and posterior probability have been initialized, the process of FIG. 4 continues at step 452 where the first mixture component of the prior probability and the observation probability is selected.

At step 454, an iteration is performed to find the mean for the posterior probability, p(n,x,c|y) of the selected mixture. The process for performing this iteration is shown in FIG. 6.

Figure 6:
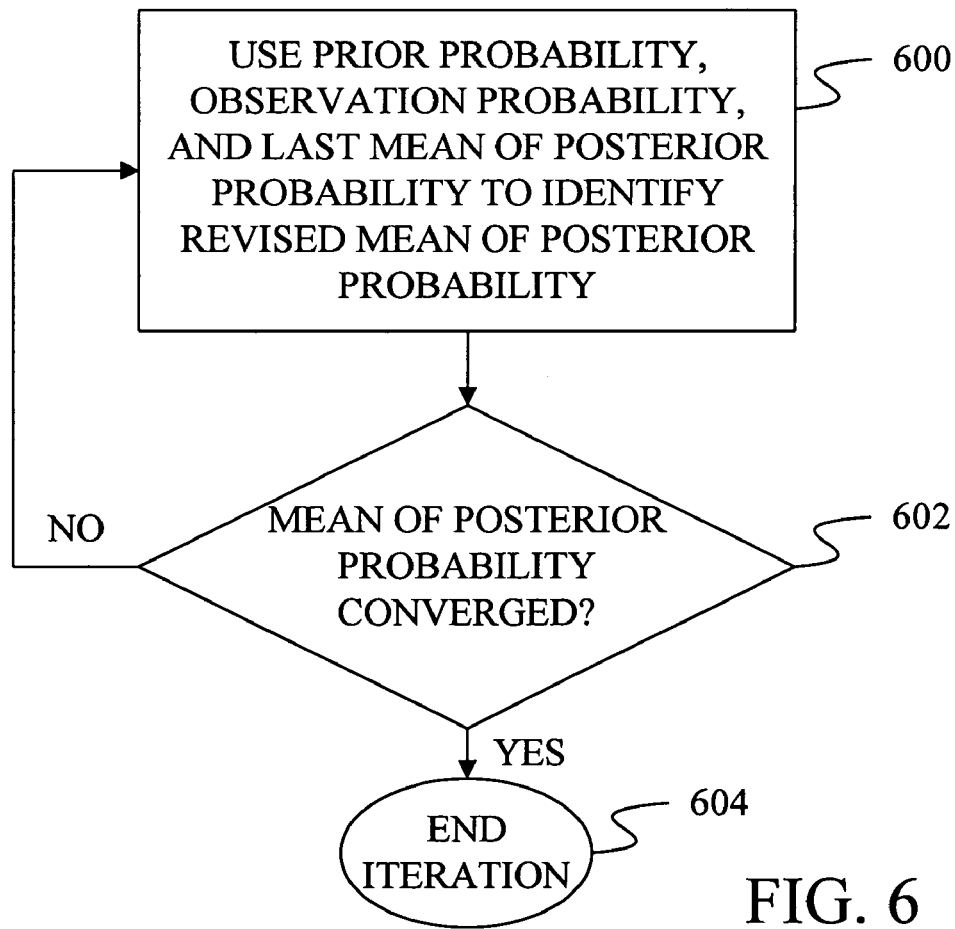
FIG. 6 is a flow diagram of iteration step 454 of FIG. 4.

In step 600 of FIG. 6, the prior probability, the observation probability, and the last determined mean of the posterior probability are used to identify a new mean for the posterior probability. In particular, the new mean for the posterior probability is calculated according to the variational inference principle and procedures as:

$$\underline{\eta} = \underline{\eta}_p + (\Sigma^{-1} + g'(\underline{\eta}_p)^T \Psi^{-1} g'(\underline{\eta}_p))^{-1} (\Sigma^{-1}(\underline{\mu} - \underline{\eta}_p) + g'(\underline{\eta}_p)^T \Psi^{-1} (\underline{y} - g)(\underline{\eta}_p))) \quad \text{EQ. 5}$$

where $\underline{\eta}$ is the newly calculated mean for the posterior probability of the current mixture, $\underline{\eta}_p$ is the past mean for the posterior probability, $\Sigma^{-1}$ is the inverse of the covariance matrix for this mixture component of the prior probability, $\mu$ is the mean for this mixture component of the prior probability, $\Psi$ is the variance of this mixture component of the observation probability, $g(\underline{\eta}_p)$ is the right-hand side of equation 3 evaluated at the last mean, $g'(\underline{\eta}_p)$ is the matrix derivative of equation 3 calculated at the last mean, and $\underline{y}$ is the observed feature vector.

In equation 5, $\mu$, $\underline{\eta}$ and $\underline{\eta}_p$ are M-by-1 matrices where M is three times the number of elements in each feature vector. In particular, $\mu$, $\underline{\eta}$ and $\underline{\eta}_p$ are described by vectors having the form:

$$\mu; \underline{\eta}; \underline{\eta}_p :: \begin{bmatrix} \frac{M}{3} \text{Elements For Clean Signal Feature Vector} \\ \frac{M}{3} \text{Elements For Noise Feature Vector} \\ \frac{M}{3} \text{Elements For Channel Distortion Feature Vector} \end{bmatrix} \quad \text{EQ. 6}$$

Using this definition for $\mu$, $\underline{\eta}$ and $\underline{\eta}_p$, equation 3 above can be described as:

$$g(\underline{\eta}_p) = \underline{\eta}_p\left(\frac{2M}{3}+1: M\right) + \underline{\eta}_p\left(1: \frac{M}{3}\right) + C \ln\left(1 + e^{C^{-1}\left(\underline{\eta}_p\left(\frac{M}{3}+1: \frac{2M}{3}\right) - \underline{\eta}_p\left(\frac{2M}{3}+1: M\right) - \underline{\eta}_p\left(1: \frac{M}{3}\right)\right)}\right) \quad \text{EQ. 7}$$

where the designations in equation 7 indicate the spans of rows which form the feature vectors for those elements.

In equation 5, the derivative $g'(\underline{\eta}_p)$ is a matrix of order $$\frac{M}{3}\text{-by-}M$$

where the element of row i, column j is defined as:

$$[g(\underline{\eta}_p)]_{i,j} = \frac{\partial [g(\underline{\eta}_p)]_i}{\partial [\underline{\eta}_p]_j} \quad \text{EQ. 8}$$

where the expression on the right side of equation 8 is a partial derivative of the equation that describes the ith element of $g(\underline{\eta}_p)$ relative to the jth element of the $\underline{\eta}_p$ matrix. Thus, if the jth element of the $\underline{\eta}_p$ matrix is the fifth element of the noise feature vector, $n_5$, the partial derivative will be taken relative to $n_5$.

Note that when the transform matrix, C, of equation 7 is equal to the identity matrix, the ith element of $g(\underline{\eta}_p)$ is defined as:

$$[g(\underline{\eta}_p)]_i = c_i + x_i + \ln(1 + e^{n_i - c_i - x_i}) \quad \text{EQ. 9}$$

so that the partial derivative only has nonzero values for $[\underline{\eta}_p]_j$ equal to $n_i$, $c_i$, or $x_i$.

After equation 7 has been used to determine a new mean for the posterior probability at step 600, the process of FIG. 6 continues at step 602 where a stopping criterion is tested. For example, the mean may be examined to determine whether it has converged. Under most embodiments, this is determined by comparing the new mean to the last mean determined for the posterior probability. If the difference between these two means is larger than some threshold, the process returns to step 600 using the new mean as the last mean and determining a revised new mean. In another embodiment, a fixed number of iterations is performed. Those skilled in the art will recognize that other techniques for determining when to stop the iterations may be used with the present invention.

Steps 600 and 602 are repeated until the stopping criterion is satisfied, at which point the iteration of FIG. 6 ends at step 604. When the process of FIG. 6 reaches step 604, step 454 of FIG. 4 is complete. The process of FIG. 4 then continues at step 456 where the variance for the posterior probability of the current mixture component is determined. Under one embodiment of the present invention, the variance for the posterior probability is found in the premultiplier in the second term of the right hand expression of equation 5. The variance is determined by evaluating this factor at the selected mean for the posterior probability.

Figure 7:
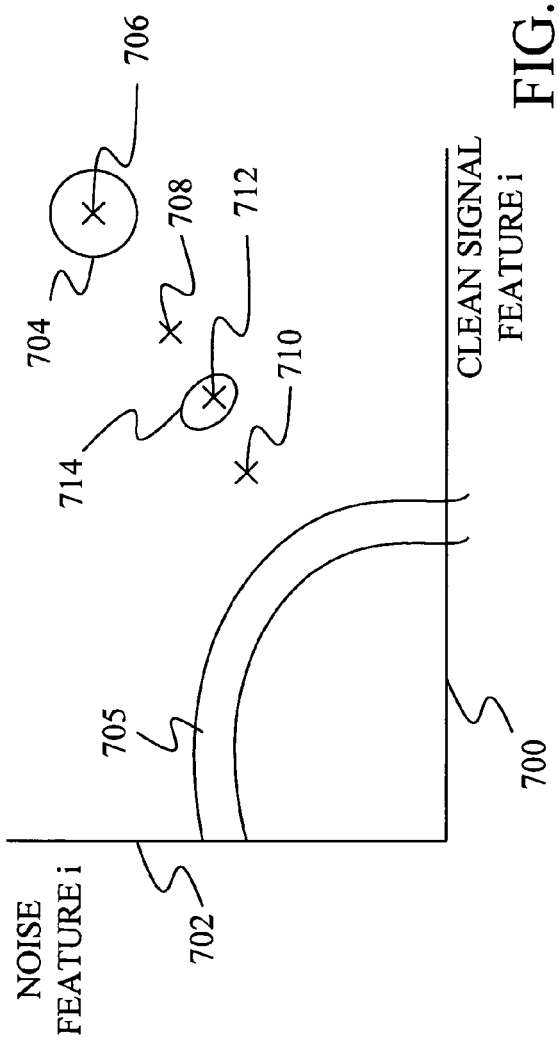
FIG. 7 is a graph showing a prior observation distribution, an observation distribution and posterior distributions during the iteration of FIG. 6.

The effects of the iterations of FIG. 6 are shown in FIG. 7 for a single feature of the feature vectors. In FIG. 7, feature i of a clean signal feature vector is shown along horizontal axis 700 while feature i of a noise feature vector is shown along vertical axis 702. A distribution 704 with a mean 706 is shown in this space for a mixture component of the prior probability. FIG. 7 also includes a distribution 705 for the observation probability.

Before the iterations of FIG. 6 begin, the mean of the posterior probability is set equal to mean 706. After a first iteration through step 600, the mean of the posterior probability has shifted to location 708. After a second iteration, the mean has shifted to location 710. On the final iteration, the mean moves to location 712 and the iteration ends. The variance of the posterior probability is then determined at step 456 providing a distribution 714 for the posterior probability.

Note that the mean of the posterior probability settles at a location between the prior probability distribution and the observation probability distribution 705. Thus, the posterior probability distribution is a balance between the prior probability distribution 704 and the observation probability 705.

After the mean and variance for the first mixture component of the posterior probability has been determined, the process of FIG. 4 continues by determining whether there are more mixture components at step 458. If there are more mixture components, the next mixture component is selected at step 460 and steps 454 and 456 are repeated for the new mixture component.

Once all of the mixture components have had their mean and variance determined for the posterior probability, the process of FIG. 4 continues at step 462 where the mixture components are combined to identify a most likely noise feature vector, channel distortion feature vector, and clean signal feature vector given the observed noisy signal feature vector. Under one embodiment, the noise feature vector, channel feature vector, and clean signal feature vector are calculated as:

$$n_{post} = \sum_{s=1}^{S} \rho_s \eta_s\left(\frac{M}{3}+1: \frac{2M}{3}\right) \quad \text{EQ. 10}$$

$$c_{post} = \sum_{s=1}^{S} \rho_s \eta_s\left(\frac{2M}{3}+1: M\right) \quad \text{EQ. 11}$$

$$x_{post} = \sum_{s=1}^{S} \rho_s \eta_s\left(1: \frac{M}{3}\right) \quad \text{EQ. 12}$$

where S is the number of mixture components, $\rho_s$ is the weight for mixture component s, $$\eta_s\left(\frac{M}{3}+1: \frac{2M}{3}\right)$$

is the noise feature vector for the mean of the posterior probability, $$\eta_s\left(\frac{2M}{3}+1: M\right)$$

is the channel distortion feature vector for the mean of the posterior probability, $$\eta_s\left(1: \frac{M}{3}\right)$$

is the feature vector for the clean signal of the mean of the posterior probability, and $n_{post}$, $c_{post}$, and $x_{post}$ are the average values of the noise feature vector, channel distortion feature vector, and clean signal feature vector, respectively, given the observed noisy feature vector.

The weight for each mixture component, $\eta_s$ is calculated as:

$$\rho_s = \frac{\pi_s e^{G_s}}{\sum_{i=1}^{S} \rho_i} \quad \text{EQ. 13}$$

where the dominator of equation 13 normalizes the weights by dividing each weight by the sum of all other weights for the mixture components. In equation 13, $\pi_s$ is a weight associated with the mixture components of the prior probability and is determined as:

$$\pi_s = \pi_s^x \cdot \pi_s^n \cdot \pi_s^c \quad \text{EQ. 14}$$

where $\pi_s^x$, $\pi_s^n$ and $\pi_s^c$ are mixture component weights for the prior clean signal, prior noise, and prior channel distortion, respectively. These weights are determined as part of the calculation of the mean and variance for the prior probability.

In equation 13, $G^s$ is a function that affects the weighting of a mixture component based on the shape of the prior probability and posterior probability, as well as the similarity between the selected mean for the posterior probability and the observed noisy vector and the similarity between the selected mean and the mean of the prior probability. Under one embodiment, the expression for $G^s$ is:

$$G_s = \left[ -\frac{1}{2}\ln|2\pi\Sigma_s| + \frac{1}{2}\ln|2\pi\Phi_s| - \right. \quad \text{EQ. 15}$$
$$\frac{1}{2}(y - g(\underline{\eta_s}))^T \Psi^{-1}(y - g(\underline{\eta_s})) - \frac{1}{2}(\underline{\eta_s} - \underline{\mu_s})^T \Sigma_s^{-1}(\underline{\eta_s} - \underline{\mu_s}) -$$
$$\frac{1}{2} \text{ sum of diagonal elements of } (\Sigma_s^{-1} \cdot \Phi_s) -$$
$$\left. \frac{1}{2} \text{ sum of diagonal element of } (\underline{g'(\eta_s)}^T \Psi^{-1} \underline{g'(\eta_s)} \Sigma_s^{-1}) \right]$$

where $\ln|2\pi\underline{\Sigma}_s|$ involves taking the natural log of the determinate of $2\pi$ times the covariance of the prior probability, $\ln|2\pi\Phi_s|$ involves taking the natural log of the determinant of $2\pi$ times the covariance matrix of the posterior probability, which is the premultiplier of the second term of the right hand side of equation 5.

Those skilled in the art will recognize that there are other ways of using the mixture approximation to the posterior to obtain statistics. For example, the means of the mixture component with largest $\rho$ can be selected. Or, the entire mixture distribution can be used as input to a recognizer.

Figure 8:
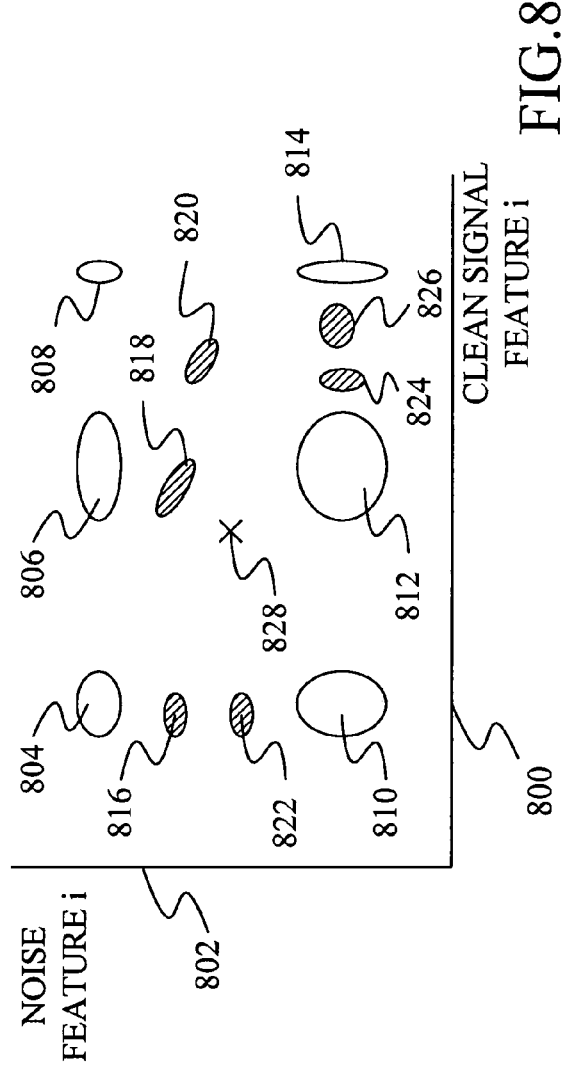
FIG. 8 is a graph showing prior distributions and posterior distributions for a mixture of components as well as a final mean for the combined posterior probability.

An example of the determination of the posterior noise feature vector, channel distortion feature vector, and clean signal feature vector are shown in FIG. 8. In FIG. 8, as in FIG. 7 above, feature i of the clean signal is shown along horizontal axis 800 and feature i of the noise is shown along vertical axis 802. Note that for simplicity, feature i for the channel is not shown, but would provide a third dimension if placed in FIG. 8.

In FIG. 8, there are six mixture components 804, 806, 808, 810, 812 and 814 for the prior probability. The prior mixture components are associated with six mixture components for the posterior probability indicated as distributions 816, 818, 820, 822, 824 and 826, respectively. These posterior mixture probabilities are combined to identify a single vector 828 that describes the most likely clean signal feature vector, noise feature vector, and channel distortion feature vector given the observed noisy feature vector. Note that in FIG. 8, only one feature is shown, however the discussion of FIG. 8 should be interpreted as extending to all of the features of the feature vectors. Thus, in practice, FIG. 8 is an M dimensional space and vector 828 is an M dimensional vector.

After the noise feature vector, channel distortion feature vector, and clean signal feature vectors have been determined from the posterior mixture components, the process of FIG. 4 continues at step 464 by determining if there are anymore noisy vectors that need to be cleaned. If there are, steps 452, 454, 456, 458, 460 and 462 are repeated to generate a clean signal vector for the noisy vector. When all of the noisy vectors have been processed at step 464, the noise reduction technique of FIG. 4 ends at step 466.

The present invention differs from the prior art in a number of ways. First, as discussed above, the present invention utilizes the variance of the noise and channel features. Also, the present invention utilizes a mixture of Gaussians to represent the noise component of the prior probability and to represent the channel distortion component of the prior probability. By using mixtures of Gaussians to model the noise and channel distortion, it is thought that the present invention will remove noise and channel distortion more accurately than if the noise and channel were modeled as single points as was done in the prior art. In practice, it is highly likely that the use of mixture of Gaussians for noise and for channels allows the algorithm to deal effectively with time-varying noise and channels, because an instantaneous noise and channel value can be accurately represented by one of many Gaussian components in the mixture distribution.

Similarly, the present invention, as shown in equation 5, also takes the variance of the observation probability into consideration when identifying the mean for the posterior probability. In prior art noise reduction techniques, this variance was assumed to be zero. By taking this variance into account, the present invention is able to more accurately select the mean for the posterior probability because it takes into account the error present in the approximation of equation 3.

Lastly, the iterative technique of the present invention is not shown in the prior art. Thus, prior art noise reduction systems do not iteratively modify the estimate of the clean signal vector. Instead, the prior art makes a single selection for the clean feature vector and does not try to improve upon that selection once it has been made.

Although the invention has been described above with reference to two signals (a clean signal and a noise signal), and one channel, the invention is not limited to this combination. In particular, additional signals from additional sources may be present and the signals may pass through more than one filter or channel. Those skilled in the art will recognize that the equations described above may be extended to cover any number of signals and any number of channels.

Although the present invention has been described with reference to particular embodiments, workers skilled in the art will recognize that changes may be made in form and detail without departing from the spirit and scope of the invention.

What is claimed is:

1. A method comprising:
   identifying a mixture of distributions that provide prior probabilities for combinations of clean signal feature vectors and obscuring feature vectors, the mixture of distributions comprising mixture components each comprising a mean and variance;
   determining an observation variance for an observation probability that provides the probability of a noisy signal feature vector given a clean signal feature vector and at least one obscuring feature vector;
   calculating a mean for a posterior probability distribution by applying a mean and a variance of a mixture component of the mixture of distributions that provide prior probabilities and the observation variance to a function;
   using the mean of the posterior probability distribution to identify the clean signal feature vector; and
   using the clean signal feature to identify a word during speech recognition.

2. The method of claim 1 wherein determining an observation variance comprises using a closed-form expression to determine the variance.

3. The method of claim 1 wherein determining an observation variance comprises:
   generating a feature vector from a clean signal;
   generating a feature vector from a noise signal;
   generating an observed noisy signal feature vector from a noisy signal that is the combination of at least the clean signal and the noise signal;
   calculating a calculated noisy signal feature vector from the feature vector from the clean signal and the feature vector from the noise signal;
   comparing the observed noisy signal feature vector to the calculated noisy signal feature vector to determine the variance.

4. The method of claim 3 wherein determining an observation variance further comprises determining a feature vector for channel distortion and wherein calculating a calculated noisy signal feature vector further comprises calculating the calculated noisy signal feature vector in part from the feature vector for channel distortion.

5. The method of claim 1 wherein identifying a mixture of distributions that provide prior probabilities comprises identifying a mixture of distributions for the obscuring feature vectors and a mixture of distributions for the clean signal feature vectors.

6. A method comprising:
   accessing a prior mean for a distribution of training feature vectors that represents a prior probability of combinations of training feature vectors wherein the prior mean of the distribution of training feature vectors comprises a prior mean vector comprising elements representing a mean of a mixture component of a mixture of distributions for clean signal feature vectors and elements representing a mean of a mixture component of a mixture of distributions for noise training feature vectors;
   setting an initial value for a posterior mean vector comprising elements for a component of a clean signal feature vector and elements for a component of a noise feature vector;
   determining a revised value for the posterior mean vector based in part on the initial value for the posterior mean vector, a difference between the prior mean vector and the initial value for the posterior mean vector, and a noisy signal feature vector, wherein the noisy signal feature vector represents a noisy signal that is a combination of a clean signal with at least one of a group comprising a noise signal and channel distortion;
   determining whether to accept the revised value as a final value for the posterior mean vector;
   using the final value for the posterior mean vector to identify a clean signal feature vector; and
   using the clean signal feature vector to recognize a word during speech recognition.

7. The method of claim 6 wherein determining whether to accept the revised value as a final value comprises:
   deciding not to accept the revised value as the final value;
   determining a further revised value for the posterior mean vector based in part on the revised value for the posterior mean vector, the difference between the prior mean vector and the revised value for the posterior mean vector, and the noisy signal feature vector; and
   determining whether to accept the further revised value as a final value for the posterior mean vector.

8. The method of claim 6 wherein the steps of the method are repeated for a plurality of distributions of training feature vectors to generate a final value for a posterior mean vector for a plurality of components of the clean signal feature vector.

9. The method of claim 6 wherein determining a revised value comprises determining a revised value based in part on a variance associated with the noisy signal feature vector.

10. The method of claim 6 wherein the distribution of training feature vectors is described in part by a variance.

11. The method of claim 6 wherein accessing a prior mean for a distribution further comprises accessing a prior mean vector comprising elements representing a mean of a mixture component of a mixture of distributions for channel distortion training feature vectors.

12. A computer-readable storage medium having encoded thereon computer-executable instructions that when executed by a processor cause the processor to perform steps comprising:

accessing a noisy signal feature vector that represents a noisy signal which is a combination of a clean signal with at least one of a group comprising noise and channel distortion;

accessing prior mean vector for at least one distribution of training feature vectors wherein accessing a prior mean vector comprises accessing a prior mean vector comprising elements representing a mean vector for a distribution of noise training feature vectors described in part by a variance, and elements representing a mean vector for a distribution of clean signal training feature vectors;

identifying an initial value for a posterior mean vector comprising elements for a clean signal feature vector and elements for a noise feature vector; and performing iterations to identify a final value for the posterior mean vector, each iteration performing a calculation based on the noisy signal feature vector, the difference between the prior mean vector and a current value for the posterior mean vector, and the current value for the posterior mean vector, the current value for the posterior mean vector being updated with each iteration;

using the final value for the posterior mean vector to identify a clean signal feature vector; and using the clean signal feature vector in speech recognition to recognize a word.

13. The computer-readable storage medium of claim 12 wherein performing a calculation at each iteration further comprises performing the calculation based on a variance for the noisy signal feature vector.

14. The computer-readable storage medium of claim 12 wherein the distribution of noise training feature vectors is a mixture component of a mixture of distributions for noise training feature vectors.

15. The computer-readable storage medium of claim 12 wherein the prior mean vector further comprises elements representing a mean vector for a distribution of channel distortion training feature vectors described in part by a variance.

16. The computer-readable storage medium of claim 15 wherein the distribution of channel distortion training feature vectors is a mixture component of a mixture of distributions for channel distortion training feature vectors.

17. The computer-readable storage medium of claim 16 wherein a first prior mean vector comprises elements representing a mean vector for a distribution of channel distortion training feature vectors associated with a first channel and a second prior mean vector comprises elements representing a mean vector for a distribution of channel distortion training feature vectors associated with a second channel.

* * * * *